United States Patent
Zysman

(10) Patent No.: US 8,910,362 B2
(45) Date of Patent: Dec. 16, 2014

(54) MANUFACTURE OF REBUILT MATTRESSES AND FOUNDATIONS

(76) Inventor: Simon Zysman, Toronto (CA)

(*) Notice: Subject to any disclaimer, the term of this patent is extended or adjusted under 35 U.S.C. 154(b) by 1635 days.

(21) Appl. No.: 12/284,683

(22) Filed: Sep. 24, 2008

(65) Prior Publication Data

US 2009/0077784 A1 Mar. 26, 2009

Related U.S. Application Data

(60) Provisional application No. 60/974,915, filed on Sep. 25, 2007.

(51) Int. Cl.
*B68G 7/00* (2006.01)
*B09B 5/00* (2006.01)
*A47C 23/00* (2006.01)
*A47C 27/00* (2006.01)

(52) U.S. Cl.
CPC . *B09B 5/00* (2013.01); *A47C 23/00* (2013.01); *A47C 27/00* (2013.01)
USPC .......................................... 29/403.3; 29/91.1

(58) Field of Classification Search
USPC ................. 29/403.1, 403.3, 91, 91.1, 402.09, 29/402.21, 898.92
See application file for complete search history.

(56) References Cited

U.S. PATENT DOCUMENTS

| | | | | |
|---|---|---|---|---|
| 5,048,167 | A * | 9/1991 | Heffley et al. | 29/91.1 |
| 6,101,718 | A * | 8/2000 | Zysman | 29/896.92 |
| 2005/0013727 | A1* | 1/2005 | Hedman | 422/3 |
| 2007/0240810 | A1* | 10/2007 | Khambete | 156/166 |
| 2009/0007339 | A1* | 1/2009 | Chen et al. | 5/691 |
| 2009/0008298 | A1* | 1/2009 | Studley | 209/2 |

* cited by examiner

*Primary Examiner* — Christopher Besler
(74) *Attorney, Agent, or Firm* — Hudak, Shunk & Farine Co. LPA

(57) ABSTRACT

A process is described for converting the spring components and the cushioning and covering materials derived from discarded mattresses and foundations into materials suitable for the manufacture of rebuilt units which comply with given governmental regulatory requirements. A preliminary optional step in the process comprises heating the discarded mattress at 230° F. to ensure that the components produced by deconstruction may be safely reused and recycled.

7 Claims, No Drawings

MANUFACTURE OF REBUILT MATTRESSES AND FOUNDATIONS

BACKGROUND OF THE INVENTION

The mattress innerspring was introduced into commerce around 1880. For many years thereafter, once the surface of a mattress containing an innerspring became uneven or lumpy, it would commonly be restored by someone plying the trade of innerspring mattress renovator.

In developed countries, during the 1950's and 60's, this practice of servicing and renewing mattresses fell into disuse. Mattresses and foundations joined the multitude of other used products entering the waste stream, and renovation was superseded by replacement.

At more or less the same time in the United States and elsewhere, another kind of renovation trade proliferated—the rebuilding of discarded mattresses and foundations for sale to new owners. These new owners, mainly poor or working poor or institutions serving them, could not find suitable donated used bedding and could not afford to buy new. The makers (rebuilders) of these products (rebuilts) sourced the discarded items by scavenging at the curbside, at dumps and transfer stations and, increasingly from the 1970's onward, from bedding retailers who offered pick up and removal of a customer's discarded bedding when delivering the new.

A mattress rebuilder usually removes no more than the original cover. Occasionally one of the cushioning layers inside the discarded mattress is removed as well, due to damage, excessive soiling, or contamination. In all other cases, the cushioning layers are not removed. There has been no legal, aesthetic, technical or economic imperative for removal. Moreover, the labor cost of removal and the cost of replacing the material removed are significant. The removal of cushioning layers requires a labour-intensive process of severing the two hundred or more metal staples (hog rings) that secure the edge of the inner lining of the mattress cover to the perimeter of the inner spring assembly, thus preventing the mattress cover from shifting.

As it is usually the case that there is more than one layer of cushioning remaining in the mattress being rebuilt, one or more of these layers will be invisible, and thus not capable of being accurately classified.

For consumer health protection it is necessary to inspect each layer of cushioning before assembling a rebuilt. As just noted, this procedure is not possible under the current common practice of rebuilders. The present invention facilitates such inspection greatly.

While, as outlined above, rebuilders do not completely deconstruct the mattresses they are processing for sale, they often add layers of cushioning to increase the overall thickness, and thus the market value, of the rebuilt. These added layers are of used material, usually harvested from unrebuildable discarded mattresses. They are ripped from the inner spring without taking the time to sever the hog rings, usually creating fissures in the layers and leaving behind clumps of cushioning embedded in the hog rings.

The added layers are chosen by determining their size (twin, double, queen) and thickness; the quality and content of the layers is relatively unimportant, and will vary widely from one rebuilt to the next. That is because the rebuilder's intake typically includes mattresses and foundations ranging from one year to sixty years old and older. The design, fabrication, and content of mattresses and foundations has changed frequently over the past 80 years, in response to technology, consumer taste, and the urgent search of the post-mature mattress industry for frequent, and ever more marginally necessary, style and technical changes. In consequence, very few, if any of the mattresses processed by a typical rebuilder during a given day or week are likely to resemble one another in any way, except in their (new) covering material, their style of quilting and overall finish.

The process of rebuilding is to be distinguished in this regard from manufacturing a mattress with entirely new cushioning and covering materials. In the latter case, a finite number of standardized products are created, each with detailed specifications for all of its cushioning materials, as well as its cover. Then a standard method of assembly packaging and quality assurance is specified.

It is known to manufacture mattresses ab initio in which an inner spring assembly is re-used. First, the outer ticking and cushioning material are entirely removed from the inner spring assembly of an old mattress, then, bent components on the inner spring assembly are straightened and, finally, new ticking and cushioning materials are attached to the inner spring assembly. However, there is usually a degree of metal fatigue in the inner spring assembly, leading to a reduced load bearing capacity compared with the original mattress as manufactured. Consequently, under prevailing laws, while such refurbished mattresses may be freely returned to their original owners, they cannot be sold onward to the general public, unless labeled as product containing used material.

In my U.S. Pat. No. 6,101,718, there is described and claimed a process invention, whereby the inner spring assembly of a used mattress is removed and cleaned of all ticking and cushioning material. The inner spring assembly is then subjected to a heat treating process which provides stress relief in the wire elements of the inner spring assembly. New ticking and cushioning material are attached to produce a new mattress or similar inner spring-containing product with qualities superior to the original products when they were new, warranting the marketing of a product made according to that invention as a new mattress with recycled steel content. U.S. Pat. No. 6,101,718 is incorporated herein by reference for its teaching concerning the recycling, recovery and reconditioning of inner spring assemblies taken from used mattresses or foundations.

The economic viability of mattress rebuilding is based on the established potential for reuse of the inner spring assembly together with the cushioning and covering materials. Users of mattresses discard them through a mistaken belief that the lumps and unevenness indicate collapse of the inner spring. The reality is the opposite. So strong is the inner spring that it does not collapse, even after long use. Rather, the cushioning material collapses into the inner spring. The typical discarded mattress contains an inner spring with the potential for one or more additional complete life cycles and the cushioning, while usually somewhat stressed and compressed, can generally provide moderate comfort and support for at least another life cycle.

It will be clear, however, that the current process for rebuilding mattresses described in [0004]-[0008] above does not permit standardized methods of assembly or products. In consequence, the legal and economic viability of mattress rebuilding came into serious question with the enactment, on Jul. 1 2007, of Regulation 16 CFR 1633 of the Flammable Fabrics Act ["Standard for the Flammability (Open Flame) of Mattress Sets"] enforced by the US Consumer Product Safety Commission. In what follows, rebuilt mattresses which comply with this Regulation are referred to as "1633-compliant"

Every 1633-compliant mattress and foundation must match a prototype designed and tested according to standards and procedures set out in the Regulation. The Regulation permits the specification and production of subordinates to the prototypes. However, as with the prototypes themselves, the subordinates must be defined as a standardized product, each component identified and described in detail. Given the great and unpredictable variation in the cushioning content of rebuilt mattresses as mentioned earlier, 1633-compliant rebuilt production would require the creation of a limitless number of prototypes. The cost of specifying and testing all of them would be prohibitive.

Moreover, under 1633, each mattress and foundation must be tracked and accounted for as part of a production lot, which in turn must be linked with the consignments of components from which the production lot was created. Tracking and accounting for rebuilts in this way would be impossible.

In addition to issues of regulatory compliance and of the deconstruction/classification process in general, it would be advisable if a preliminary sanitizing treatment process were carried out to ensure that the end components may be safely reused and recycled. An aspect of my invention (The Zysmanizing™ process) refers to treatment of a discarded unit (previously slept-on mattress or foundation) which has been discarded by the original owner.

SUMMARY OF THE INVENTION

The principal object of the present invention is to provide a process for converting the spring components, and the cushioning and covering materials derived from discarded mattresses and foundations into materials suitable for the manufacture of rebuilts which comply with strict regulatory requirements such as those of 16 CFR 1633. A significant attendant benefit and advantage of so doing is the creation of potentially significant market demand for the spring components and the post-consumer mattress and foundation cushioning materials, materials that would otherwise be landfilled or used in ways which are illegal and/or dangerous to public health.

It is a further objective of the invention to mitigate the anticipated increase in waste (loss of waste diversion) when current rebuilding operations are forced out of business by the imposition of stricter regulations.

It is a related, further objective of the present invention to specify ranges of attributes of post-consumer cushioning materials to satisfy regulatory requirements on the one hand while, on the other, enabling mattress rebuilders to use those components in their operations to the greatest degree and in as efficient a manner as possible.

With a view to achieving these objectives, the process of the invention in its broadest aspect comprises the steps of fully deconstructing a mattress or foundation; separating the layers of cushioning and covering materials from the spring component and sorting said materials by class; separating each class, according to dimensions and physical properties, into components which correspond to selected prototypes complying with regulatory requirements; and labeling and packaging the components.

As mentioned above, a further related objective of the present invention is to provide a pretreatment (Zysmanizing™) to address contamination of the original unit, eg. as a result of having been placed outside a dwelling unit for a significant length of time. This preliminary process comprises removing any packaging from the discarded unit, then drying the unit, with or without the application of heat. Finally, the dry unit is subjected to heating at 230° F. for 90 minutes or longer. The unit is then dismantled and the components according to the basic invention summarized above.

I have found that the commercial viability of my invention is greatly enhanced where packaging and transporting of the components is effected by flat packing of the post-consumer mattress inner springs and inner pocketed coil constructions and of the inner foundation constructions with coil springs (collectively referred to herein as "the spring components") together with baling of the foam components.

Owing to the serious consideration of transportation costs, mattress/foundation processing according to the invention is best performed close to the source of the used material (principally, distribution centres of mattress retailers). By the same token, the marketability of the spring components and cushioning components declines significantly and progressively where markets are separated more than fifty kilometers from the source. By compressing the spring components and the foam cushioning components, the barrier to accessing distant markets eliminated to a large degree.

I have also found that a collateral benefit of the flat packing of the spring components is the attendant relieving of stress in the spring components to achieve an enhanced of physical properties. The baling of foam components brings a collateral benefit in stressing the foam cushion, so as to reduce variance between the hardness of its previously-slept-on and its not-previously-slept-on portions.

According to the invention, a number of the aforementioned prototypes complying with regulatory requirements, are prepared and used as reference points for rebuilt products related to the tested prototypes, but using the post-consumer components prepared by the above process. Substitutability of the post-consumer components for the pre-consumer material in tested prototypes is established by the comparative testing of relevant properties, in particular the characteristics of ignition and heat release on burning.

DETAILED DESCRIPTION OF THE INVENTION

As noted above, rebuilders do not normally fully deconstruct in their rebuilding process. Full deconstruction is labour intensive and thus avoided if at all possible.

Full deconstruction is the essential first step in the process for converting the cushioning and covering materials in discarded mattresses and foundations into cushioning materials suitable for the manufacture of 1633-compliant rebuilts.

Every 1633-compliant mattress and foundation must match a prototype designed and tested according to standards and procedures set out in the Regulations. By "prototype" is meant a specific design of mattress set that serves as a model for production units intended to be introduced into commerce and which has the same characteristics as the production units.

The Regulation does permit the specification and production of subordinate prototypes, i.e. mattress sets based on a qualified prototype and differing from the qualified prototype only with respect to a few properties set out in detail in the Regulation. Existing rebuilding procedures run afoul of this Regulation, on a number of scores, in particular, because the subordinate prototypes must be defined as standardized products, with each component identified and described in detail (including vendor name).

The present invention provides a framework for creating compliant prototypes and subordinate prototypes of rebuilt mattresses consisting of a way of specifying a prototype/subsidiary prototype conforming to regulatory requirements and a way of defining the attributes of each post-consumer component of a specified prototype/subsidiary prototype.

Example 1

Specification of a Prototype for 1633-Compliant Mattresses

The following protocol is employed
(i) specify the pre-consumer components of the prototype (ii) list the post-consumer components of the prototype (layers of cushioning materials/inner core);
(iii) provide detailed specifications of each layer of cushioning material, including
vendor name
dimensions, chemical composition and physical properties, given in ranges, for each attribute, from the minimum necessary to support the rebuilders quality standard for the products to produce relative to the prototype to a maximum being the value of the attribute in the samples selected for testing;
(iv) provide detailed specifications of the inner core, including:
vendor name
dimensions, chemical composition and physical properties, within ranges from minimum to maximum as stated above for cushioning materials.

CONCLUSION

From the foregoing, it will be appreciated that the present invention makes it possible for the first time to design reproducible models of rebuilt mattresses and to organize efficiently the assembly of these models from standardized prepackaged post-consumer cushioning components which have been deconstructed, separated, sorted and graded by dimension and other physical properties, in order to restore them to their original individual classes ready to be packaged for shipment to the place of assembly. The compression packaging method within the invention also makes it possible to economically transport the components from their source to the point of final re-assembly.

The invention claimed is:

1. A method for reclaiming components of a used mattress or foundation and for the construction of rebuilt mattresses or foundations, comprising the steps of:
    (i) fully deconstructing a used mattress or foundation;
    (ii) separating two or more layers of cushioning and covering materials of the used mattress or foundation including springs thereof and sorting these by class;
    (iii) separating each said class, according to dimensions and physical properties, into components, which correspond to selected prototypes of rebuilt mattress or foundation;
    (iv) labelling and packaging the components; and
    (v) constructing a rebuilt mattress or foundation comprising selectively assembling said labeled components comprising springs, cushioning, and covering materials of one or more used mattresses or foundations that have been reclaimed.

2. A method according to claim 1, wherein said prototypes have been selected for compliance with regulatory requirements.

3. A method according to claim 2, wherein said regulatory requirements are those of Regulation 16 CFR 1633 of the Flammable Fabrics Act (Jul. 1, 2007) and amendments thereto.

4. A method for reclaiming the components of a used mattress or foundation and for the construction of rebuilt mattresses or foundations, comprising the steps of:
    (i) heating the used mattress or foundation at 230° F. for at least 90 minutes;
    (ii) fully deconstructing the used mattress or foundation;
    (iii) separating two or more layers of cushioning and covering materials of the used mattress or foundation including springs thereof and sorting these by class;
    (iv) separating each said class, according to dimensions and physical properties, into components which correspond to selected prototypes of rebuilt mattress or foundation;
    (v) labelling and packaging the components; and
    (vi) constructing a rebuilt mattress or foundation comprising selectively assembling said labeled components comprising springs, cushioning, and covering materials of one or more sued mattresses or foundations that have been reclaimed.

5. A method according to claim 4, further comprising a preliminary step of drying the used mattress or foundation if damp.

6. A method according to claim 1 wherein the step of deconstructing comprises: separating the cushioning and covering materials from spring components; transporting the cushioning, foam components and covering materials and the spring components to a select location for re-assembly into a rebuilt mattress or foundation.

7. The method of claim 6 comprising the further step of packing the spring components flat prior to transporting.

* * * * *